US006414931B1

United States Patent
Maeda et al.

(10) Patent No.: US 6,414,931 B1
(45) Date of Patent: Jul. 2, 2002

(54) LENS DRIVING DEVICE, OPTICAL HEAD AND OPTICAL DISC SYSTEM

(75) Inventors: Fumisada Maeda; Isao Ichimura; Kenji Yamamoto, all of Tokyo; Kiyoshi Ohsato, Chiba; Toshio Watanabe, Kanagawa, all of (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/159,778

(22) Filed: Sep. 24, 1998

(30) Foreign Application Priority Data

Sep. 30, 1997 (JP) .............................. 9-267488

(51) Int. Cl.[7] .................................................. G11B 7/00
(52) U.S. Cl. ............................. 369/112.24; 369/44.23; 369/13.33; 369/94
(58) Field of Search .......................... 369/112, 44.14, 369/44.23, 44.24, 58, 110, 112.24, 33.13, 112.26, 112.07, 94

(56) References Cited

U.S. PATENT DOCUMENTS

| | | | |
|---|---|---|---|
| 5,473,471 A | 12/1995 | Yamagata | 359/569 |
| 5,526,336 A | * 6/1996 | Park et al. | 369/112.07 |
| 5,691,971 A | * 11/1997 | Kim | 369/112.24 |
| 5,712,842 A | 1/1998 | Yamamoto et al. | 369/112.26 |
| 5,729,393 A | * 3/1998 | Lee et al. | 369/44.15 |
| 5,764,613 A | 6/1998 | Yamamoto et al. | 369/112.24 |
| 5,818,643 A | 10/1998 | Fujioka | 359/637 |
| 5,828,635 A | * 10/1998 | Choi | 369/44.14 |
| 6,097,688 A | 8/2000 | Ichimura | 369/112.24 |

FOREIGN PATENT DOCUMENTS

| | | |
|---|---|---|
| JP | 9139343 | 5/1997 |
| JP | 9251645 | 9/1997 |

* cited by examiner

*Primary Examiner*—William Korzuch
*Assistant Examiner*—Kim-Kwok Chu
(74) *Attorney, Agent, or Firm*—Rader, Fishman & Grauer PLLC; Ronald P. Kananen, Esq.

(57) ABSTRACT

A recording/reproducing apparatus for an optical recording medium in which a laser light beam is illuminated on an optical recording medium using a double-lens type objective lens made up of at least a first lens and a second lens to record and/or reproduce the information. The apparatus includes a first lens for converging the laser light illuminated from a light source, a second lens arranged between the first lens and the optical recording medium and a voice coil motor for causing relative movement of the first and second lenses for varying the distance therebetween in the direction along the optical axis. The first lens is moved to vary the distance between the first and second lenses. This enlarges the numerical aperture and diminishes the effect of aberration to enable high-density recording and/or reproduction of information signals to a high recording density.

12 Claims, 7 Drawing Sheets

LENS DRIVING DEVICE, OPTICAL HEAD AND OPTICAL DISC SYSTEM

BACKGROUND OF THE INVENTION

1. Field of the Invention

This invention relates to an objective lens driving device for driving an objective lens for condensing a light beam on a signal recording surface of an optical recording medium, and an optical head having such lens driving device.

2. Description of the Related Art

Among recording mediums for information signals, there is an optical recording medium for recording/reproducing the information signals using an optical head. This recording medium may be enumerated by an optical disc, a magneto-optical disc or a phase-change optical disc. For increasing the information recording density of the optical recording medium, it is effective to increase the numerical aperture NA of the objective lens of the optical head. By increasing the numerical aperture NA of the objective lens, the spot size of the light beam condensed on the signal recording surface of the optical recording medium can be decreased to improve the information recording density.

Meanwhile, an objective lens of the conventional optical head, used for collecting the light from a light source on a signal recording surface, includes a sole lens. That is, the objective lens used in the conventional optical head is a so-called single-lens type lens.

If, in this optical head, the numerical aperture NA of the objective lens is to be increased, the single-lens type lens needs to have an extremely large refractive power. If the refractive power of the single-lens type lens is to be increased, the radius of curvature of the reflective surface needs to be extremely small, while refractive surfaces need to be positioned extremely accurately. Thus, if the objective lens of the optical head is a single-lens type lens, the numerical aperture NA cannot be raised beyond approximately 0.6.

In an optical recording medium, there is usually provided on the signal recording layer a layer adapted for protecting the signal recording surface (termed herein a cover glass). The light beam from the optical head falls on the signal recording surface via this cover glass. If the cover glass thickness deviates from its prescribed value, spherical aberration is produced. If the spherical aberration of a higher order is disregarded, this spherical aberration is proportionate to the numerical aperture NA raised to the fourth power. Therefore, if the numerical aperture NA of the objective lens is increased, the tolerance value of the thickness error of the cover glass is decreased significantly. That is, if the numerical aperture NA of the objective lens is increased, there is raised an extremely severe demand on the thickness tolerance of the cover glass to render it difficult to manufacture the optical recording medium.

As an optical head for solving the problem inherent in the conventional optical head, there has been proposed in U.S. Pat. No. 5,712,842 or U.S. Pat. No. 5,764,613 an optical head in which an objective lens is constituted by two lenses 101, 102, as shown in FIG. 1.

In this optical head, the objective lens is constituted by a first lens 101 on which falls the light beam from the light source and a second lens 102 on which falls the light beam converged by the first lens 101. The light beam from the light source is condensed by the first lens 101 and by the second lens 102 in this order before being illuminated on the optical recording medium. When the light beam is condensed by the first and second lenses 101, 102 so as to be then illuminated on the optical recording medium, the first and second lenses 101, 102 are moved by a biaxial actuator in a direction perpendicular to the optical axis in order o effectuate tracking servo. In addition, the first and second lenses 101, 102 are moved by the biaxial actuator along the optical axis in order to effectuate focussing servo.

In this optical head, if the refractive power of each of the first and second lenses 101, 102 is small, the two-lens system, consisting of the combination of the two lenses 101, 102, can have a large value of the numerical aperture NA. This realizes the numerical aperture exceeding 0.6, which it has been difficult to achieve with the optical head having a single-lens type lens as an objective lens.

Also, in the optical head employing the two-lens system, employing the biaxial actuator to effectuate tracking servo and focussing servo as described above, it is also possible to have a voice coil motor mounted on the second lens 102, instead of using the biaxial actuator, and to cause the second lens 102 to be moved by this voice coil motor along the optical axis to suppress the spherical aberration.

That is, not only the two-lens type lens system, made up of the first and second lenses 101, 102, is moved by the biaxial actuator, but also the second lens 102 is moved along the optical axis in the manner of cancelling the spherical aberration brought about by changes in film thickness of the cover glass of the optical recording medium by the voice coil motor mounted on the second lens 102, in order to reduce the spherical aberration.

That is, if, with the optical head having the two-lens type lens system as an objective lens, the voice coil motor is mounted on the second lens 102 to render it possible to adjust the distance between the first lens 101 and the second lens 102, it is possible to overcome the problem that the spherical aberration is increased with increased numerical aperture of the objective lens.

If, for cancelling the spherical aberration, the second lens 102 is adapted to be movable with respect to the first lens 101, it is necessary to increase the attenuation factor of the voice coil motor adapted for causing movement of the second lens 102 facing the optical recording medium. The attenuation factor of the voice coil motor can be increased by, for example, charging the viscous fluid. However, since the viscosity of the viscous fluid in general has temperature dependency, the viscous fluid is changed in viscosity by fluctuations in the external air temperature if the viscous fluid is charged to increase the attenuation factor of the voice coil motor, with the result that the focussing servo is rendered unstable.

For maintaining stability of focussing servo, the attenuation factor of the voice coil motor mounted on the second lens 102 needs to be increased. However, if the attenuation factor of the voice coil motor is increased, there is produced hysteresis in displacement characteristics with respect to the input current to render it impossible to realize high-speed stable operation.

Also, with the two-lens type lens system shown in FIG. 1, the second lens 102 facing the optical recording medium can be displaced, so that, if the second objective lens 102 collides against the optical recording medium, the distance between the first lens 101 and the second lens 102 is varied significantly, with the result that it is difficult to maintain an appropriate distance between the two lenses. Moreover, if the second lens 102 collides against the optical recording medium, there is imposed a large load on the member movably supporting the second lens 102, such that there is the risk of destruction of the supporting member.

SUMMARY OF THE INVENTION

It is therefore an object of the present invention to provide a lens driving device for driving an objective lens designed to converge a light beam on an optical recording medium in which the numerical aperture NA of the objective lens can be increased to suppress the spherical aberration and in which focussing servo can be effectuated speedily and stably.

It is another object of the present invention to provide an optical head having such lens driving device.

In one aspect, the present invention provides a lens driving device for driving a lens adapted for collecting the light from a light source on a signal recording surface of an optical recording medium, first driving means having a movable portion which is adapted for being moved in a direction along the optical axis of the light from the light source and in a direction perpendicular to the optical axis, second driving means mounted on a movable portion of the first driving means and having a movable portion movable in the direction along the optical axis of the light from the light source, a first lens on which falls the light from the light source, and a second lens on which falls the light collected by the first lens. The second driving means is mounted on the movable portion of the fist driving means and the first lens is mounted on the movable portion of the second driving means.

In the present lens driving device, the light from the light source is collected by the first lens and by the second lens in this order so as to be illuminated on the signal recording surface of the optical recording medium. The second lens mounted on the movable portion of the first driving means, the second driving means and the first lens mounted on the movable portion of the second driving means are driven in the direction along the optical axis and in a direction perpendicular to the optical axis to effectuate tracking servo and focussing servo. In the present lens driving device, the first lens can be driven in the direction along the optical axis to cancel the spherical aberration.

If, in the present lens driving device, an amount of movement $\Delta Z$ of the focal point position of the light collected by the first lens and the second lens when the first lens is moved along the optical axis by $\Delta Z1$ and the second lens is moved along the optical axis by $\Delta Z2$ is expressed with a coefficient $\alpha$ by the following equation $$\Delta Z = (\Delta Z1 + \alpha \cdot \Delta Z2)(1+\alpha),$$

the ratio of a weight m2 of the movable portion of the first driving means and the member mounted on the movable portion to a weight m1 of the movable portion of the second driving means and the member mounted on the movable portion, or m2/m1, is preferably not larger than the coefficient $\alpha$. By setting the ratio m2/m1 so as to be not larger than $\alpha$, open loop characteristics in case of focussing servo are improved.

Also, in the present lens driving device, the second driving means is a voice coil motor which has its upper and lower ends along the optical axis supported by elastic supporting members, and which is adapted for driving the movable portion in a direction along the optical axis. The center of gravity of the movable portion and the member mounted on the movable portion in the direction along the optical axis is in the vicinity of a mid point along the optical axis of an elastic supporting member supporting the upper end of the movable portion and an elastic supporting member supporting the lower end of the movable portion.

In another aspect, the present invention provides an optical head including a light source, lens driving means for driving a lens adapted for collecting the light on a signal recording surface of an optical recording medium and light receiving means for receiving the return light which is collected on the signal recording surface of the optical recording medium by the lens driven by the lens driving means and which is reflected back by the optical recording medium. The the lens driving means includes first driving means having a movable portion which is adapted for being moved in a direction along the optical axis of the light from the light source and in a direction perpendicular to the optical axis, second driving means mounted on a movable portion of the first driving means and having a movable portion movable in the direction along the optical axis of the light from the light source, a first lens on which is incident the light from the light source and a second lens on which is incident the light collected by the first lens. The second driving means is mounted on the movable portion of the first driving means. The first lens is mounted on the movable portion of the second driving means, while the second lens is mounted on the movable portion of the first driving means.

In the present optical head, the light from the light source is collected by the first lens and by the second lens in this order so as to be illuminated on the signal recording surface of the optical recording medium. The second lens mounted on the movable portion of the first driving means, second driving means and the first lens mounted on the movable portion of the second driving means is driven in the direction along the optical axis and in a direction perpendicular to the optical axis to effectuate tracking servo and focussing servo. In the present optical head, the first lens can be driven in the direction along the optical axis to cancel the spherical aberration.

Also, if, in the present optical head, an amount of movement $\Delta Z$ of the focal point position of the light collected by the first lens and the second lens when the first lens is moved along the optical axis by $\Delta Z1$ and the second lens is moved along the optical axis by $\Delta Z2$ is expressed with a coefficient $\alpha$ by the following equation $$\Delta Z = (\Delta Z1 + \alpha \cdot \Delta Z2)(1+\alpha),$$

the ratio of a weight m2 of the movable portion of the first driving means and the member mounted on the movable portion to a weight m1 of the movable portion of the second driving means and the member mounted on the movable portion, or m2/m1, is preferably not larger than the coefficient $\alpha$. By setting the ratio m2/m1 so as to be not larger than $\alpha$, open loop characteristics in case of focussing servo are improved.

Moreover, in the present optical head, the second driving means is a voice coil motor having its upper and lower ends along the optical axis supported by elastic supporting members, and which is adapted for driving the movable portion in a direction along the optical axis. Preferably, the center of gravity of the movable portion and the member mounted on the movable portion in the direction along the optical axis is in the vicinity of a mid point along the optical axis of an elastic supporting member supporting the upper end of the movable portion and an elastic supporting member supporting the lower end of the movable portion.

According to the present invention, as described above, there is provided a lens driving device in which the numerical aperture NA of the objective lens can be enlarged and spherical aberration can be suppressed, while focussing servo can be realized speedily and in stability. In addition, there is provided an optical head having such lens driving device.

DESCRIPTION OF THE PREFERRED EMBODIMENTS

Figure 1:
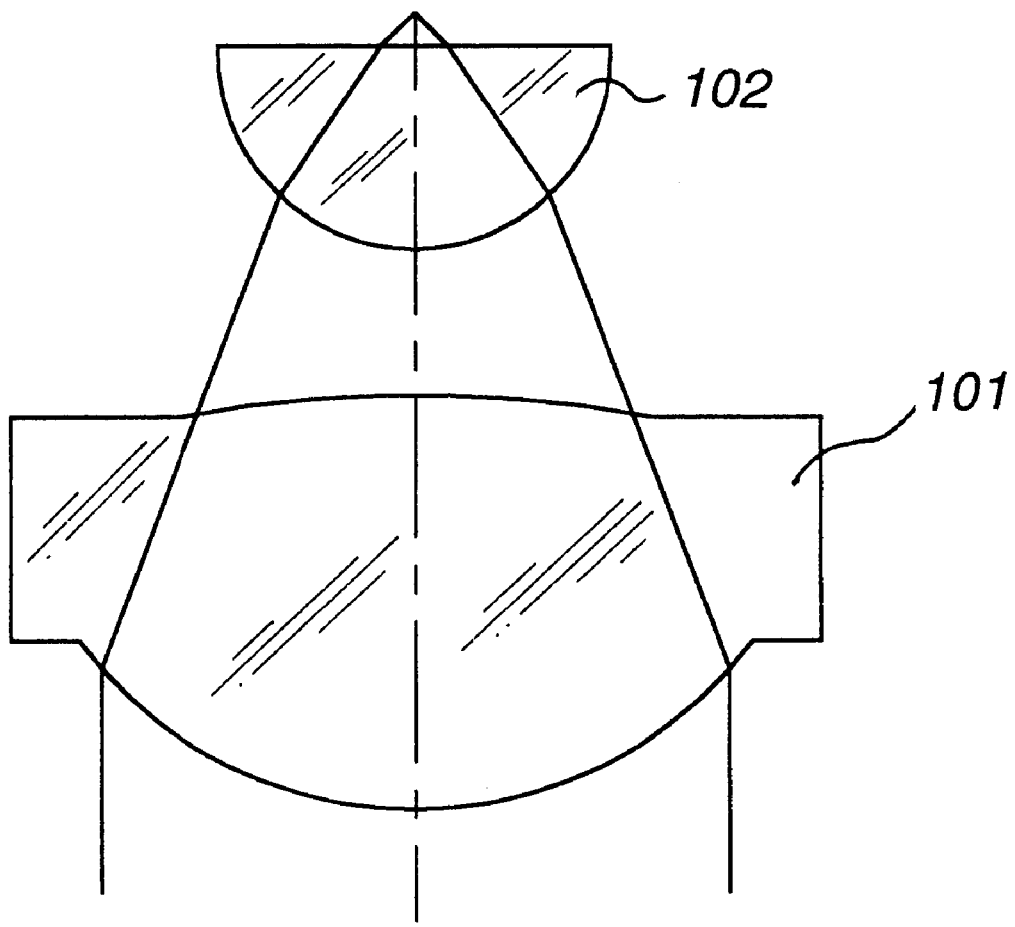
FIG. 1 is a schematic view showing a conventional optical head.

Referring to the drawings, preferred embodiments of the present invention will be explained in detail.

Figure 2:
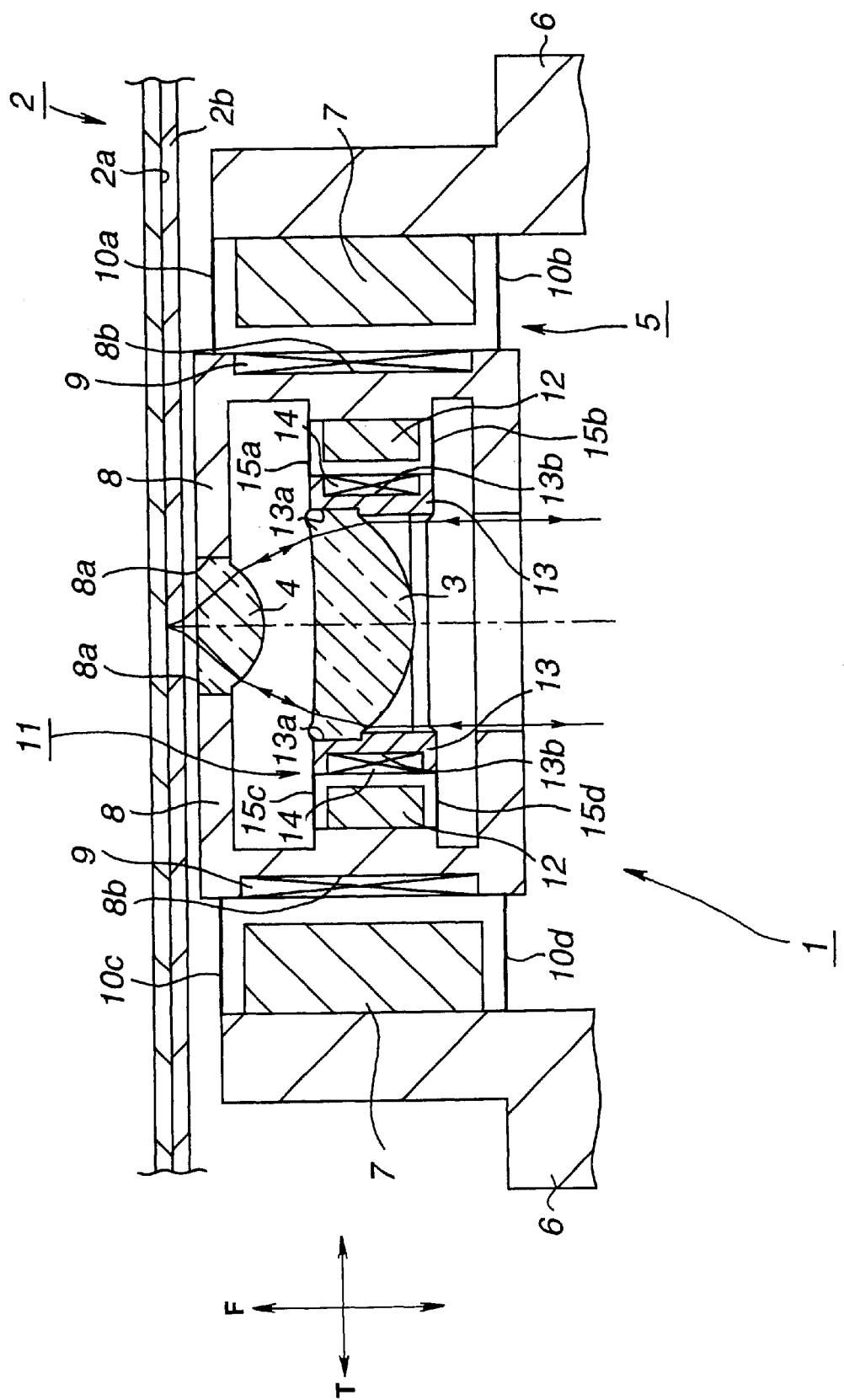
FIG. 2 is a schematic cross-sectional view showing a lens driving device embodying the present invention.

FIG. 2 shows an illustrative structure of a lens driving device embodying the present invention, this lens driving device 1 is adapted for driving an objective lens for converging a light beam on a signal recording surface 2a of an optical recording medium 2, such as an optical disc or a magneto-optical disc, and is used for an optical head adapted for recording and/or reproducing information signals on or from the optical recording medium 2.

This lens driving device 1 includes, as an objective lens, a first lens 3 and a second lens 4 on which is incident the light converged by the first lens 3. It is noted that the first lens 3 is remoter from the optical recording medium 2 and herein termed a backward lens 3, and that the second lens 4 is closer to the optical recording medium 2 and herein is termed a forward lens 4.

By designing the objective lens as a double-lens type lens made up of the backward lens 3 and the forward lens 4, it becomes possible to increase the numerical aperture NA of the double-lens type lens in its entirety. Specifically, it is possible rather readily with the double-lens type lens to set the numerical aperture NA so as to be 0.8 or higher.

The lens driving device 1 includes a biaxial actuator 5 as driving means for causing movement of an objective lens made up of the backward lens 3 and the forward lens 4. The objective lens made up of the backward lens 3 and the forward lens 4 is moved by this biaxial actuator 5 in a direction along the optical axis shown by arrow F in FIG. 2 (focussing direction) by way of effectuating focussing servo. On the other hand, the objective lens made up of the backward lens 3 and the forward lens 4 is moved by the biaxial actuator 5 in a direction perpendicular to the optical axis shown by arrow T in FIG. 2 (tracking direction) by way of effectuating tracking servo.

In the lens driving device 1 embodying the present invention, a variety pf systems used in the conventional lens driving devices can be directly used as a mechanism of the biaxial actuator 5 for causing movement of the objective lens made up of the backward lens 3 and the forward lens 4 and as the driving method. Therefore, detailed description therefor is omitted and only the mechanism for causing movement of the backward lens 3 and the forward lens 4 in the focusing direction is briefly explained by referring to FIG. 2.

In the embodiment shown in FIG. 2, the mechanism for causing movement of the objective lens made up of the backward lens 3 and the forward lens 4 in the focussing direction includes a yoke and a magnet 7, mounted on a base block 6 of the lens driving device 1, a bobbin 8 and a coil for focussing servo 9 placed around the outer periphery of the bobbin 8.

The bobbin 8 is a movable portion operating when driving the biaxial actuator 5 in the focussing direction and in the tracking direction, and includes a lens supporting portion 8a for engaging with and holding the outer rim of the forward lens 4, and a coil winding portion 8b around which is wound the coil for focussing servo 9. The forward lens 4 is placed around the coil winding portion 8b of the bobbin 8.

This bobbin 8 is supported by four elastic supporting members 10a, 10b, 10c, 10d so that the coil for focussing servo 9 placed around the coil winding portion 8b will face the yoke and the magnet 7 with a defined gap in-between. Specifically, one ends of the elastic supporting members 10a, 10b, 10c, 10d are mounted on upper and lower ends of both sides of the bobbin 8, with the opposite side ends of the elastic supporting members 10a, 10b, 10c, 10d being mounted on the base block 6 of the lens driving device 1. It is noted that the elastic supporting members 10a, 10b, 10c, 10d are constituted by spring plates of a metal material or a synthetic resin material, and that the bobbin 8 is supported by these elastic supporting members 10a, 10b, 10c, 10d for movement in the focussing and tracking directions.

In this lens driving device 1, the magnetic field from the yoke and the magnet 7 is generated in the radial direction of the bobbin 8. Thus, if the current is allowed to flow through the coil for focussing servo 9, there is produced a Lorentz's force by the interaction of the current with the magnetic field from the yoke and the magnet 7, as a result of which the driving force in the focussing direction is generated for the bobbin 8 around which is placed the coil for focussing servo 9. Therefore, by controlling the current flowing in the coil for focussing servo 9, the objective lens mounted on the bobbin 8 can be moved along with the bobbin 8 in the focussing direction by way of effectuating focussing servo.

Although not explained specifically, the tracking servo is effectuated by much the same mechanism. In effectuating tracking servo, the current flowing through a coil for tracking servo, not shown, may be controlled to cause movement of the objective lens mounted on the bobbin in the tracking direction along with the bobbin 8.

It is noted that the lens driving device 1 embodying the present invention is provided not only with the biaxial actuator 5 for effectuating focussing servo and tracking servo, but also with a voice coil motor 11 on the bobbin 8 operating as a movable portion of the biaxial actuator 5. This voice coil motor 11 is made up of a yoke and a magnet 12, mounted on the bobbin 8 of the biaxial actuator 5, a bobbin 13 mounted on the bobbin 8 of the biaxial actuator 5 for movement in the focussing direction, and a spherical aberration correction coil 14 placed around the bobbin 13.

The bobbin 13 is a movable portion of the voice coil motor 11 and is molded to a substantially tubular shape. This bobbin 13 is made up of a lens supporting portion 13a, fitted on the outer rim of the backward lens 3 for holding the lens and a coil winding portion 13b around which is placed the spherical aberration correction coil 14. It is noted that the spherical aberration correction coil 14 is placed around the outer periphery of the coil winding portion 13b of the bobbin 13 so that the coil 14 forms a substantially concentric circle with respect to the backward lens 3.

The bobbin 13 of the voice coil motor 11 is supported by four elastic supporting members 15a, 15b, 15c and 15d so that the spherical aberration correction coil 14 will face the yoke and the magnet 12 with a predetermined gap in-between. Specifically, one ends of the elastic supporting members 15a, 15b, 15c, 15d are mounted on upper and lower ends of both sides of the bobbin 13, with the opposite ends of the elastic supporting members 15a, 15b, 15c and 15d being mounted on the inner wall section of the bobbin 8 of the biaxial actuator 5. It is noted that the elastic supporting members 15a, 15b, 15c and 15d are formed by spring plates of a metal material or a synthetic resin material and that the holder 13 of the voice coil motor 11 is supported by these elastic supporting members 15a, 15b, 15c and 15d for movement in the focussing direction for movement relative to the bobbin 8 of the biaxial actuator 5.

The center of gravity of the movable portion of the voice coil motor 11 and that of the member mounted on the movable portion in the focussing direction is preferably substantially coincident with the mid point in the focussing direction of the elastic supporting members 15a, 15c mounted on the upper ends of the bobbin 13 as a movable portion of the voice coil motor 11 and the elastic supporting members 15b, 15d mounted on the lower end of the bobbin 13. If the center of gravity of the movable portion of the voice coil motor 11 and that of the member mounted on the movable portion in the focussing direction is caused to coincide substantially with the mid point of the elastic supporting members 15a, 15c and that of the elastic supporting members 15b, 15d, it is possible to minimize the effect of vibrations generated on driving the voice coil motor on the tracking servo to assure more stable tracking servo.

In this voice coil motor 11, the magnetic field from the yoke and the magnet 12 is generated in the radial direction of the bobbin 13. Thus, if the current is allowed to flow through the spherical aberration correction coil 14, there is produced a Lorentz's force by the interaction of the current with the magnetic field from the yoke and the magnet 12, as a result of which the driving force in the focussing direction is generated for the bobbin 13 around which is placed the spherical aberration correction coil 14. Therefore, by controlling the current flowing in the spherical aberration correction coil 14, the backward lens 3 mounted on the bobbin 13 can be moved in the focussing direction, along with the bobbin 13, thereby varying the distance between the backward lens 3 and the forward lens 4 to cancel the spherical aberration.

As described above, the present lens driving device 1 not only has the biaxial actuator 5, as first driving means provided with a movable portion movable both in the focussing and tracking directions, but also has the voice coil motor 11, as second driving means mounted on the movable portion of the biaxial actuator 5 for movement in the focussing direction. The forward lens 4 and the backward lens 3 are mounted on the movable portions of the biaxial actuator 5 and the voice coil motor 11.

In the foregoing description, the biaxial actuator 5 exploiting the Lorentz's force for driving is taken as an example of the first driving means having a movable portion in both the focussing and tracking directions. However, the first driving means is not limited to the biaxial actuator 5 since an actuator exploiting a piezoelectric element, for example, may be used. Also, in the foregoing description, although the voice coil motor 11 exploiting the Lorentz's force for driving has been taken as an example, the second driving means are not limited thereto since an actuator exploiting the piezoelectric element may also be used.

For condensing the light beam on the signal recording surface 2a of the optical recording medium 2 using the lens driving device 1, the lens driving device 1 is arranged so that the forward lens 4 will face the signal recording surface 2a of the optical recording medium 2. This condenses the light beam from the light source by the backward lens 3 and by the forward lens 4 in this order to cause the condensed light beam to fall on the signal recording surface 2a of the optical recording medium 2.

At this time, the current flowing in the coil for focussing servo 9 is controlled for causing movement of the objective lens made up of the backward lens 3 and the forward lens 4 mounted on the bobbin 8 of the biaxial actuator 5 in the focussing direction by way of effectuating focussing servo. Also, the current flowing through the coil for tracking servo is controlled for causing movement of the objective lens made up of the backward lens 3 and the forward lens 4 mounted on the bobbin 8 of the biaxial actuator 5 in the tracking direction by way of effectuating tracking servo.

Moreover, with the lens driving device 1 according to the present invention, not only are the backward lens 3 and the forward lens 4 collectively moved by the biaxial actuator 5, but also is the backward lens 3 moved by the voice coil motor 11, by way of lens movement in the focussing direction. That is, by causing the current to flow in the spherical aberration correction coil 14 of the voice coil motor 11 to cause movement of the backward lens 3 in the focussing direction, it is possible to vary the distance between the backward lens 3 and the forward lens 4 to cancel out the spherical aberration produced due to errors in thickness of the cover glass 2b of the optical recording medium 2.

The spherical aberration correction mechanism in the lens driving device 1 embodying the present invention is further explained.

The relation between the numerical aperture NA of the objective lens and the spherical aberration caused by the errors in thickness of the cover glass 2b of the optical recording medium 2 is roughly expressed by the following equation:

$$W_{40} = \{(n^2-1)/8n^3\} \cdot (NA)^4 \cdot \Delta d \qquad (1)$$

if the aberration of the higher order is disregarded. In the above equation, n is the refractive index of the cover glass 2b and $\Delta d$ is the error in thickness of the cover glass 2b.

As may be seen from the above equation (1), the tolerance value of the thickness error $\Delta d$ is inversely proportional to the numerical aperture NA raised to the fourth power. Thus, some spherical aberration correction mechanism is required to increase the numerical aperture, if manufacturing margin of the optical recording medium 2 is taken into account. Thus, with the lens driving device 1 embodying the present invention, the objective lens is constituted by the backward lens 3 and the forward lens 4 and the distance therebetween is changed to correct the spherical aberration.

Figure 3A:
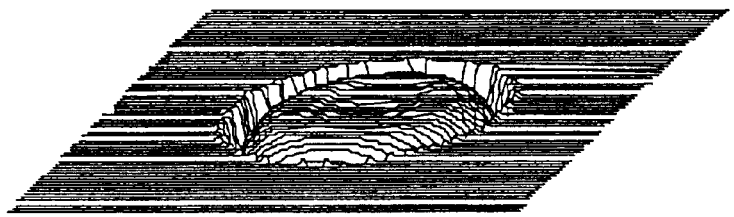
FIG. 3A shows spherical aberration produced due to the thickness of the cover glass thicker than a prescribed value.
Figure 3B:
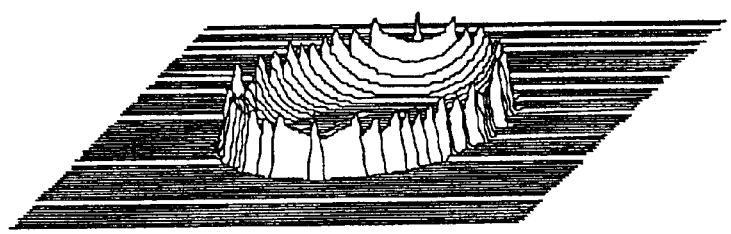
FIG. 3B shows spherical aberration produced due to the distance between a backward lens and a forward lens narrower than the prescribed value.
Figure 3C:
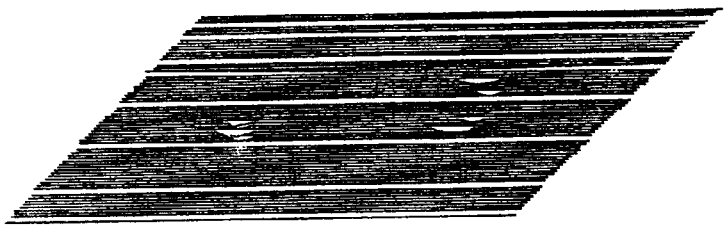
FIG. 3C shows spherical aberration resulting from addition of the spherical aberration of FIG. 3A and that of FIG. 3B.

It is assumed for example that the thickness of the cover glass 2b is thicker than a prescribed thickness, such that the spherical aberration shown in FIG. 3A is produced. In this case, the backward lens 3 is moved by the voice coil motor 11 to reduce the separation between the backward lens 3 and the forward lens 4 to a value narrower than the prescribed value to produce spherical aberration of reverse polarity as shown in FIG. 3B. The result is that the spherical aberrations cancel each other to reduce the spherical aberration substantially to nil on the whole as shown in FIG. 3C.

Thus, the spherical aberration produced due to the error in thickness of the cover glass 2b can be diminished by varying the separation between the backward lens 3 and the forward lens 4. It is noted that this mechanism is known insofar as the usage for a microscope is concerned. Also, the mechanism for an optical disc has been clarified by S. Mansfield, W. R. Studenmund, G. S. Kino and K. Osato, Optics Lett. 18,305(1993).

It should be noted that not only the spherical aberration ascribable to errors in thickness of the cover glass 2b of the optical recording medium 2 but also the spherical aberration ascribable to errors in thickness or curvature of the backward lens 3 or the forward lens 4 can be cancelled out by adjusting the distance between the backward lens 3 and the forward lens 4 by the voice coil motor 11.

Figure 4:
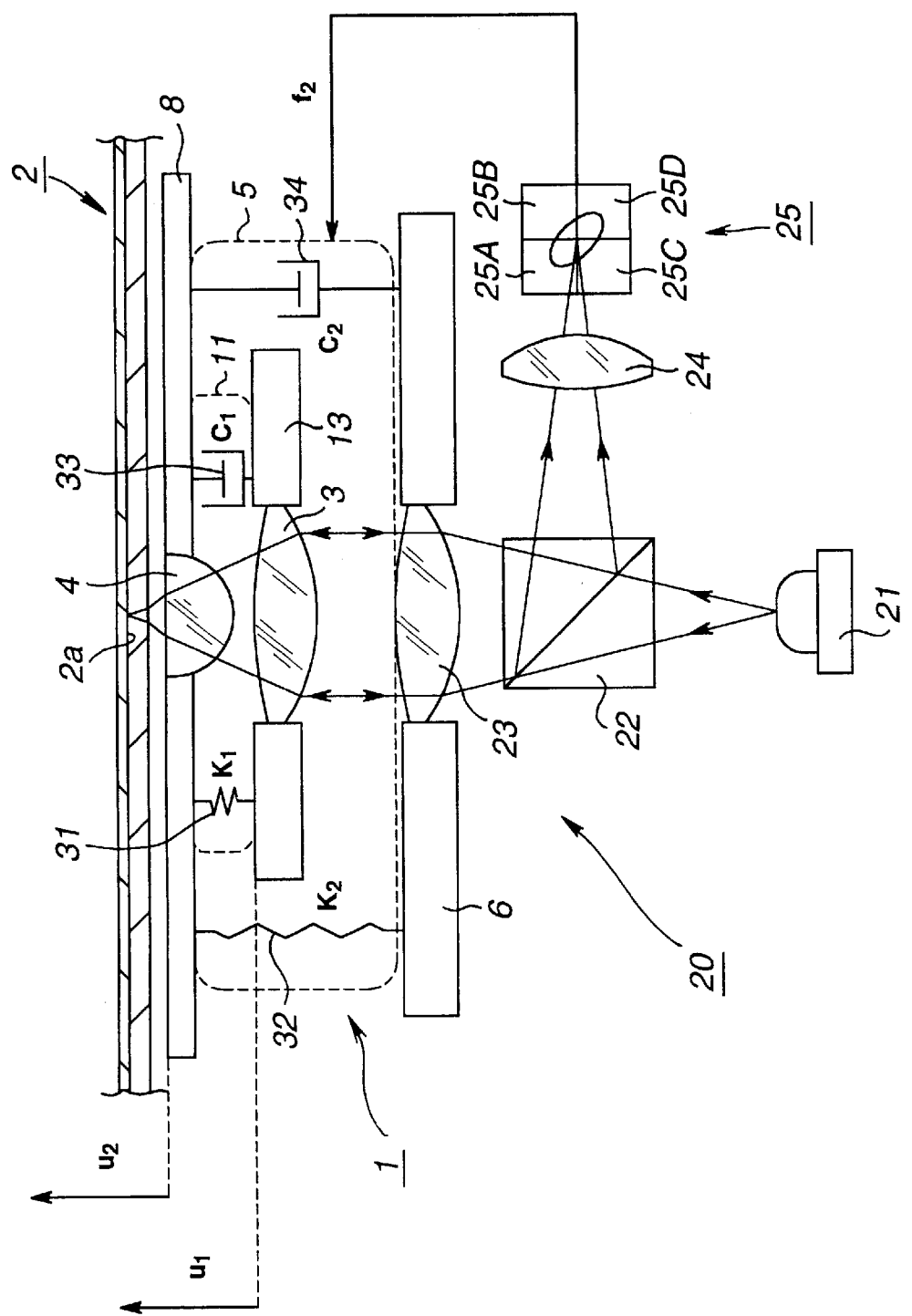
FIG. 4 shows an optical head embodying the present invention.

The behavior of focussing servo operations performed on assembling the above-described lens driving device 1 on an optical head is explained in further detail using a model shown in FIG. 4. Although the focussing servo characteristic of the present invention is hereinafter explained, the optical head can effectuate tracking servo. In addition, if information signals are reproduced from the optical recording medium 2, the optical head also detects playback signals from the return light from the optical recording medium 2. It is noted that tracking servo or detection of playback signals may be performed by any of conventional systems and hence is not explained herein specifically.

The optical head 20 includes the above-described lens driving device 1, a semiconductor laser 21 for radiating a laser light bam to the backward lens 3 of the lens driving device 1, a beam splitter 22 arranged between the semiconductor laser 21 and the backward lens 3, a collimator lens 23 arranged between the beam splitter 22 and the backward lens 3, a light collecting lens 24 for collecting the return light beam from the signal recording surface 2a of the optical recording medium 2 with astigmatic aberration and a photodetector 25 for receiving and detecting the light collected by the light collecting lens 24.

The laser light outgoing from the semiconductor laser 21 is transmitted through the beam splitter 22 to fall on the collimator lens 23 so as to be thereby converted to a collimated light beam which then falls on the backward lens 3. The light beam incident on the backward lens 3 is collected thereby and by the forward lens 4 so as to fall on the signal recording surface 2a o the optical recording medium 2.

The return light reflected back from the signal recording surface 2a again falls on the beam splitter 22 via forward lens 4, backward lens 3 and the collimator lens 23, so as to be reflected by the beam splitter 22. The reflected light is routed to the light collecting lens 24. The return light, incident on the light collecting lens 24, is collected by the light collecting lens 24 so as to have astigmatic aberration. The collected return light is incident on and received by the photodetector 25 which then detects the light intensity. The photodetector 25 has its light receiving surface split into four segments in order to detect focussing errors by the astigmatic method, and detects the intensity of the return light incident on light-receiving surfaces 25A, 25B, 25C and 25D.

The results of detection by the photodetector 25 are sent to a focussing servo detection circuit, not shown. The focussing servo detection circuit generates focussing servo signals by the astigmatic method, based on the detected results of the photodetector 25, in order to drive the biaxial actuator 5 so that the focal point position of the light beam collected by the objective lens made up of the backward lens 3 and the forward lens 4 will perpetually be on the signal recording surface 2a of the optical recording medium 2. Specifically, the coil for focussing servo 9 of the biaxial actuator 5 is fed with current to cause movement of the objective lens made up of the backward lens 3 and the forward lens 4 in the focussing direction so that the focal point of the light beam will perpetually be on the signal recording surface 2a of the optical recording medium 2.

The behavior of the focussing servo operation of the optical head 20 having the above structure is treated herein by modelling the driving portion of the lens driving device 1 using a spring 31 and dashpots 33, 34. Specifically, the voice coil motor 11 is modelled by the spring 31 and the dashpot 33 placed between the bobbin 13 carrying the backward lens 3 and the bobbin 8 carrying the forward lens 4. Similarly, the biaxial actuator 5 is modelled by the spring 32 and the dashpot 34 arranged between the base block 6 of the lens driving device 1 and the bobbin 8 carrying the forward lens 4.

It is assumed that the spring constant and the attenuation factor in the focussing direction of the voice coil motor 11 driving the backward lens 3 are denoted k1 and c1, respectively, and that the weight of the movable portion of the voice coil motor 11 and a member mounted on the movable portion is denoted by m1. It is also assumed that the spring constant and the attenuation factor in the focussing direction of the biaxial actuator 5 adapted for driving the objective lens made up of the backward lens 3 and the forward lens 4 are denoted by k2 and c2, respectively, and that the weight of the movable portion of the biaxial actuator 5 and the member mounted on the movable portion is m2.

It is further assumed that the force generated by the current fed to the coil for focussing servo 9 of the biaxial actuator 5, that is an input to this driving system, is f2, the amount of displacement of the backward lens 3 with respect to the base block 6 of the lens driving device 1 is u1 and the amount of displacement of the forward lens 4 with respect to the base block 6 of the lens driving device 1 is u2. The following equation of motion (2) holds for the biaxial actuator 5:

$$m_2 \frac{d^2 u_2}{dt^2} + C_2 \frac{du_2}{dt} + C_1\left(\frac{du_2}{dt} - \frac{du_1}{dt}\right) + k_2 u_2 + k_1(u_2 - u_1) = f_2 \quad (2)$$

On the other hand, the following equation of motion (3) holds for the voice coil motor 11:

$$m_1 \frac{d^2 u_1}{dt^2} + c_1\left(\frac{du_1}{dt} - \frac{du_2}{dt}\right) + k_1(u_2 - u_1) = 0 \quad (3)$$

By Laplace transform of the above equations (2) and (3), a transfer function T1 of displacement of the backward lens 3 and a transfer function T2 of displacement of the forward lens 4 with respect to the force f2 generated by the current fed to the coil for focussing servo 9 are obtained as shown by the following equations (4) and (5):

$$T1 = u1(s)/f2(s) \quad (4)$$

$$T2 = u2(s)/f2(s) \quad (5)$$

The relation between the displacement of the backward lens 3 in the focussing direction ΔZ1, displacement of the forward lens 4 in the focussing direction ΔZ2 and the detected focussing level error can be found by optical calculations. This relation, expressed using a coefficient α, is in the form of a linear sum indicated by the following equation (6):

$$X=(\Delta Z_1+\alpha \cdot \Delta Z_2)/(1+\alpha) \quad (6)$$

Meanwhile, the focussing error level X corresponds to the amount of displacement of the focal point position of the light collected by the backward lens 3 and the forward lens 4. On the other hand, the value of the coefficient α in the lens driving device 1 according to the present invention is a value not less than 1.

From the above equations (4), (5) and (6), a transfer function 3 of the focussing level X with respect to the input f2 is obtained as shown by the following equation (7):

$$T3=X(s)/f2(s) \quad (7)$$

By adding a term of phase compensation to the transfer function T3 and setting s=jω by way of adding the term of phase compensation, it is possible to derive open-loop characteristics of the actual focussing servo.

Figure 5:
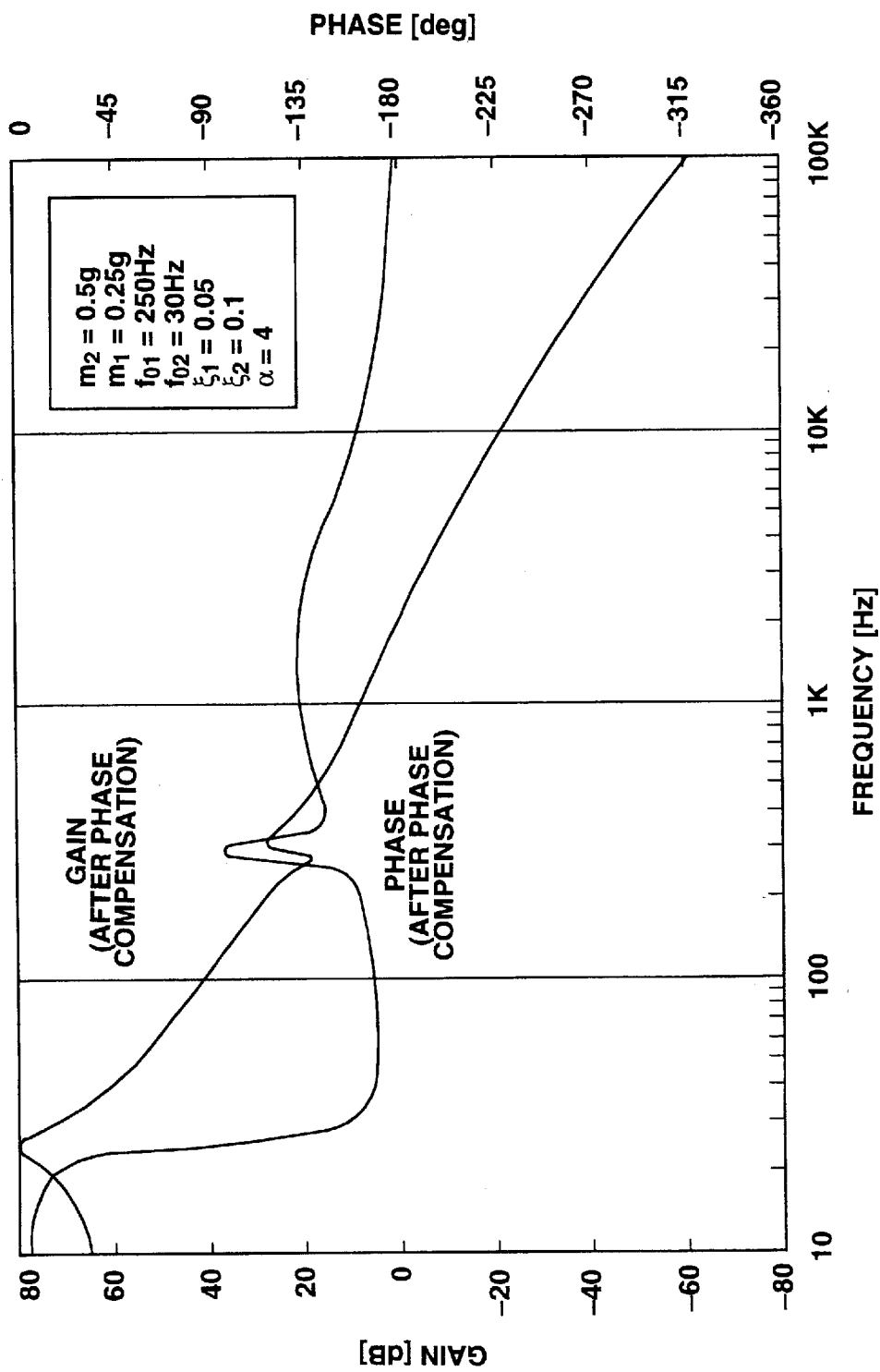
FIG. 5 is a Bode diagram showing open-loop characteristics of a voice coil motor for the weight m2 of the movable portion of a biaxial actuator and a member mounted on the movable portion equal to 0.25 g.
Figure 6:
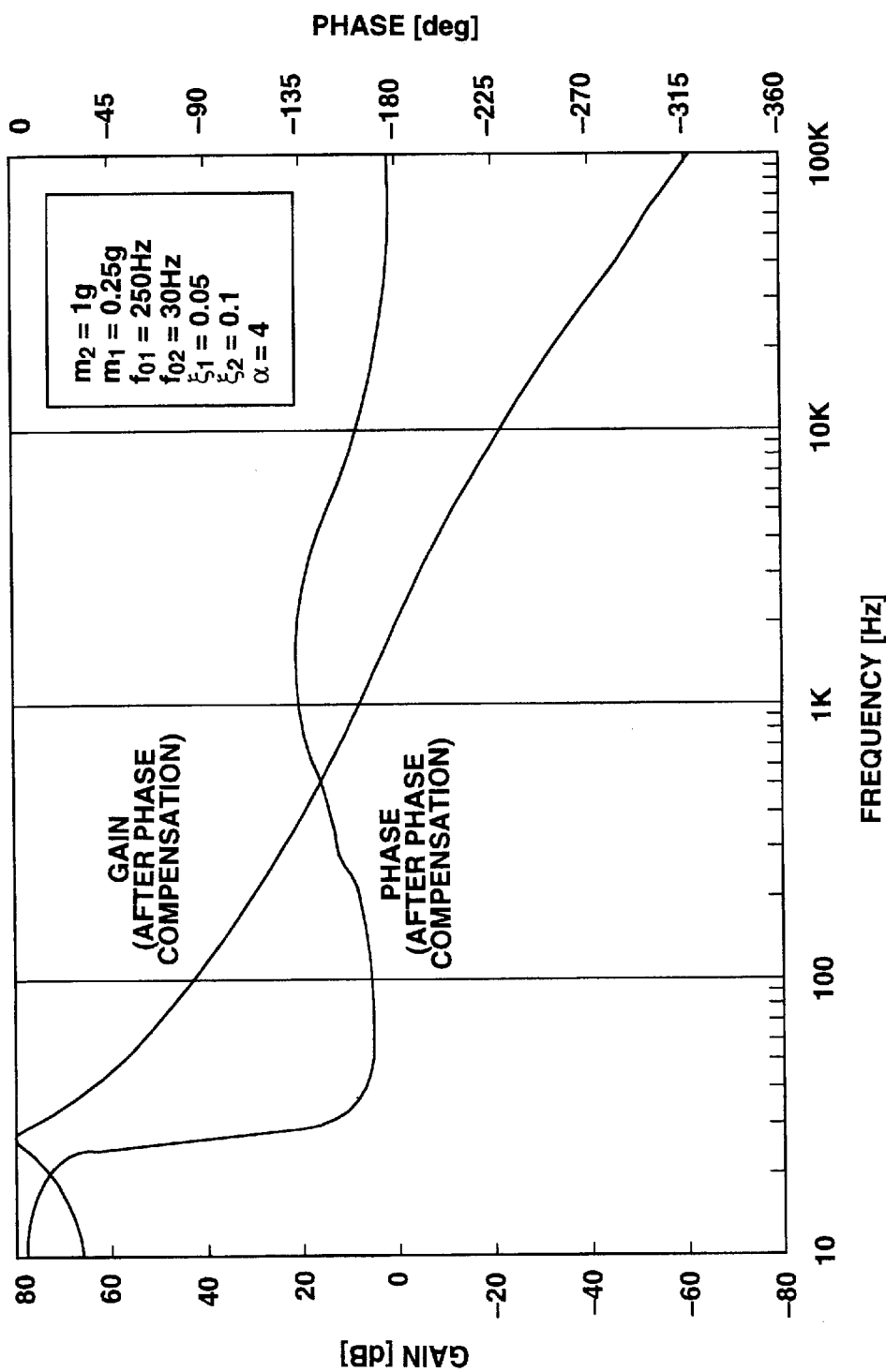
FIG. 6 is a Bode diagram showing open-loop characteristics of a voice coil motor for the weight m2 of the movable portion of a biaxial actuator and a member mounted on the movable portion equal to 1 g.
Figure 7:
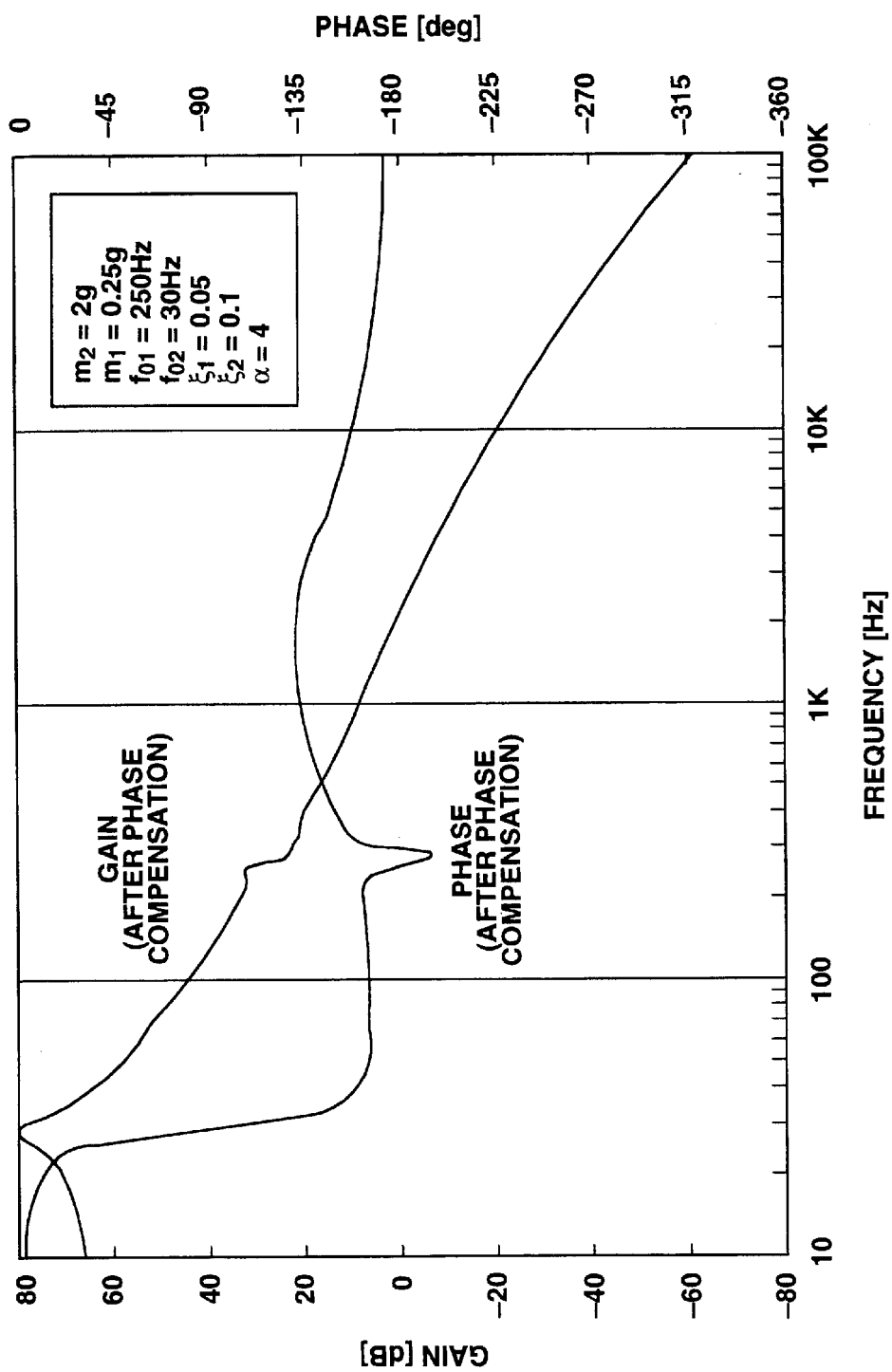
FIG. 7 is a Bode diagram showing open-loop characteristics of a voice coil motor for the weight m2 of the movable portion of a biaxial actuator and a member mounted on the movable portion equal to 2 g.

FIGS. 5 to 7 show the results derived in this manner, that is the open-loop characteristics of the actual focussing servo. FIGS. 5 to 7 are Bode diagrams showing the frequency response of the transfer function of the voice coil motor 11 (with the input being the current fed to the spherical aberration correction coil 14 of the voice coil motor 11 and with the output being displacement of the movable portion of the voice coil motor 11). In each of these figures, the abscissa and the ordinate stand for the input frequency to the voice coil motor 11 and the amplitude or phase of displacement of the movable portion of the voice coil motor 11. In deriving the open-loop characteristics shown in FIGS. 5 and 6, the values of the various parameters are set as shown in the following Table 1:

|  | FIG. 4 | FIG. 5 | FIG. 6 |
| --- | --- | --- | --- |
| weight m2 of the movable member of the biaxial actuator and a member attached to the movable member | 0.5 g | 1 g | 2 g |
| weight m1 of the movable member of the voice coil motor and a member attached to the movable member |  | 0.25 g |  |
| fundamental vibration frequency $f_{01}$ of the voice coil motor |  | 250 Hz |  |
| fundamental vibration frequency $f_{02}$ of the biaxial actuator |  | 30 Hz |  |
| attenuation factor $\xi_1$ of the voice coil motor |  | 0.05 |  |
| attenuation factor $\xi_2$ of the biaxial actuator |  | 0.1 |  |
| coefficient α |  | 4 |  |

Meanwhile, the attenuation factors $\xi_1$ and $\xi_2$ in the above Table 1 can be obtained from the actual attenuation factors and critical attenuation factor. Specifically, the attenuation factor $\xi_1$ of the voice coil motor 11 and the attenuation factor $\xi_2$ of the biaxial actuator 5 are expressed by the following equations (8) and (9), respectively:

$$\text{attenuation factor } \xi_1 \text{ actual attenuation coefficient/critical attenuation coefficient} =c1/\{2(m1 \cdot k1)^{0.5}\} \quad (8)$$

$$\text{attenuation factor } \xi_2=\text{actual attenuation coefficient/critical attenuation coefficient} =c2/\{2(m2 \cdot k2)^{0.5}\} \quad (9)$$

In the embodiment of FIG. 5, since m2=0.5 g and m1=0.25 g, m2/m1=2. Thus, m2/m1<α. In this case, the gain or the phase characteristics of displacement of the movable portion of the voice coil motor 11 are varied. However, since the phase leads −180 deg at all times, there is no risk of unstable operation.

Also, in the embodiment of FIG. 6, since m2=1 g and m1=0.25 g, m2/m1=4. Therefore, the m2/m1=α. In this case, there are produced no fluctuations in the phase lag or the gain of displacement of the movable portion of the voice coil motor 11, and hence correction of the spherical aberration or the focussing servo can be realized in stability.

Also, in the embodiment of FIG. 7, since m2=2 g and m1=0.25 g, m2/m1=8. Therefore, the m2/m1>α. In this case, the movable portion of the voice coil motor 11 undergoes phase lag in displacement not less than −180 deg in the vicinity of 200 to 300 Hz. The result is that the focussing servo is not stable due to gain fluctuations.

It is seen from above that, by setting m2/m1≦α, the phase characteristics of displacement of the movable portion during driving of the voice coil motor can be prevented from being delayed with respect to −180° to allow for stable correction of focussing servo or the spherical aberration.

It is seen from above that, with the above-described lens driving device 1, the weight m2 of the movable portion of the biaxial actuator 5 and the member attached to the movable portion is equivalent to the total weight of the bobbin 8 of the biaxial actuator 5, forward lens 4 fitted to the lens supporting portion 8a of the bobbin 8, coil for focussing servo 9 placed around the outer peripheral surface of the coil winding portion 8b of the bobbin 8, voice coil motor 11 attached to the bobbin 8 and the backward lens 3 fitted to the lens supporting portion 13a of the bobbin 13 of the voice coil motor 11. On the other hand, the weight m1 of the movable portion of the voice coil motor 11 and the member attached to the movable portion is equivalent to the total weight of the bobbin 13 of the voice coil motor 11, backward lens 3 fitted to the lens supporting portion 13a of the lens 13 and the spherical aberration correction coil 14 placed around the outer peripheral surface of the coil winding portion 13b of the bobbin 13.

Thus, with the above-described lens driving device 1, it suffices if the ratio of the total weight of the bobbin 8 of the biaxial actuator 5, the forward lens 4 fitted to the lens supporting portion 8 a of the bobbin 8, the coil for focussing servo 9 placed around the outer peripheral surface of the coil winding portion 8b of the bobbin 8, the voice coil motor 11 attached to the bobbin 8 and the backward lens 3 fitted to the lens supporting portion 13a of the bobbin 13 of the voice coil motor 11 to the total weight of the bobbin 13 of the voice coil motor 11, backward lens 3 fitted to the lens supporting portion 13a of the bobbin 13 and the spherical aberration correction coil 14 placed around the outer peripheral surface of the coil winding portion 13b of the bobbin 13 will be not larger than the above-mentioned coefficient α by properly setting the weight of each component member. This enables more stable focussing servo and correction of the spherical aberration.

If m2/m1<α, a stable servo solution can be obtained. As may be seen from FIGS. 5 to 7, the closer the value of m2/m1 to the coefficient α, the more optimum will be the phase characteristics.

If, in the lens driving device 1 of the present invention, there is a thickness error in the cover glass 2b of the optical recording medium 2, it is possible to cancel the spherical aberration ascribable to the thickness error of the cover glass 2b by adjusting the distance between the backward lens 3 and the forward lens 4b the voice coil motor 11. Also, if there is an error in the thickness or the curvature of the backward lens 3 or the forward lens 4, it is possible to cancel out the spherical aberration ascribable to the error by adjusting the distance between the backward lens 3 and the forward lens 4 by the voice coil motor 11. Therefore, with the use of the present lens driving device 1, it is possible to suppress deterioration of the recording/reproducing capability ascribable to the spherical aberration.

With the lens driving device 1 of the present invention, the forward lens 4 is secured to the movable portion of the biaxial actuator 5, while the backward lens 3 is secured to the voice coil motor 11 mounted on the movable portion of the biaxial actuator 5. By so doing, it is possible to reduce the effect which vibrations produced when varying the distance between the backward lens 3 and the forward lens 4 might have on the focussing servo. In particular, by setting m2/m1 so as to substantially coincide with α, it is possible to minimize the effect which the vibrations of the backward lens 3 might have on the focussing servo to realize extremely stable focussing servo.

With the lens driving device 1 according to the present invention, the lens-to-lens distance is varied by displacing the backward lens 3. In this case, the attenuation factor of the voice coil motor 11 used for adjusting the lens-to-lens distance can be set to a lower value than is possible with a system in which the lens-to-lens distance can be changed by moving the forward lens.

Thus, the present lens driving device 1 has an advantage of increasing the degree of freedom in designing the driving system made up of the biaxial actuator 5 and the voice coil motor 11. On the other hand, if the attenuation factor of the voice coil motor 11 is set to a lower value, the hysteresis is decreased to realize more reliable and more expeditious focussing servo. Conventionally, a viscous fluid needs to be used to raise the attenuation factor of the voice coil motor used for adjusting the lens-to-lens distance. In the lens driving device 1 of the present invention, the attenuation factor of the voice coil motor 11 can be set to a lower value so that there is no necessity of using a viscous fluid exhibiting wide fluctuations in characteristics. It is therefore possible with the present lens driving device 1 to suppress fluctuations in characteristics.

Also, with the lens driving device 1 embodying the present invention, if the objective lens collides against the optical recording medium 2, it is the forward lens 4 that collides against the optical recording medium 2, while there is no risk of collision of the backward lens 3 mounted on the movable portion of the voice coil motor 11 against the optical recording medium 2. Thus, if the objective lens of the lens driving device 1 collides against the optical recording medium 2, the lens-to-lens distance is maintained at a constant value. Moreover, even if the objective lens of the lens driving device 1 collides against the optical recording medium 2, there is no risk of collision of the backward lens 3 mounted on the movable portion of the voice coil motor 11 against the optical recording medium 2 thus scarcely loading the elastic supporting members 15a, 15b, 15c and 15d adapted for supporting the movable portion of the voice coil motor 11. The result is higher durability and reliability of the present lens driving device 1.

What is claimed is:

1. A lens driving device for driving a lens adapted for collecting the light from a light source on a signal recording surface of an optical recording medium comprising:

first driving means having a movable portion which is adapted for being moved in a direction along the optical axis of the light from said light source and in a direction perpendicular to the optical axis;

second driving means mounted on said movable portion of said first driving means and having a movable portion movable in the direction along the optical axis of the light from the light source;

a first lens mounted on the movable portion of said second driving means and on which falls the light from the light source; and a second lens mounted on the movable portion of the first driving means and on which falls the light collected by said first lens, said second lens illuminating the collected light towards said optical recording medium.

2. The lens driving device according to claim 1 further comprising:

a magnet mounted on a base portion and a coil mounted on the movable portion.

3. The lens driving device according to claim 1 wherein, if an amount of movement ΔZ of the focal point position of the light collected by the first lens and the second lens when the first lens is moved along the optical axis by ΔZ1 and the second lens is moved along the optical axis by ΔZ2 is expressed with a coefficient a by the following equation:

$$\Delta Z = (\Delta Z1 + \alpha \cdot \Delta Z2)(1+\alpha),$$

the ratio of a weight m2 of the movable portion of the first driving means and the member mounted on the movable portion to a weight m1 of the movable portion of the second driving means and the member mounted on the movable portion, or m2/m1, is not larger than said coefficient α.

4. The lens driving device according to claim 1 wherein said second driving means is a voice coil motor having its upper and lower ends along the optical axis supported by elastic supporting members, and which is adapted for driving the movable portion in a direction along the optical axis; and wherein the center of gravity of the movable portion and the member mounted on said movable portion in the direction along the optical axis is in the vicinity of a mid point along the optical axis of an elastic supporting member supporting the upper end of the movable portion and an elastic supporting member supporting the lower end of the movable portion.

5. An optical head comprising:

a light source;

lens driving means for driving a lens adapted for collecting the light on a signal recording surface of an optical recording medium; and light receiving means for receiving the return light which is collected on the signal recording surface of the optical recording medium by the lens driven by said lens driving means and which is reflected back by said optical recording medium;

said lens driving means including:

first driving means having a movable portion which is adapted for being moved in a direction along the optical axis of the light from said light source and in a direction perpendicular to the optical axis;

second driving means mounted on said movable portion of said first driving means and having a movable portion movable in the direction along the optical axis of the light from the light source;

a first lens mounted on the movable portion of said second driving means and on which falls the light from the light source; and a second lens mounted on the movable portion of the first driving means and on which falls the light collected by said first lens, said second lens illuminating the collected light towards said optical recording medium.

6. The lens driving device according to claim 5 further comprising:

a magnet mounted on a base portion and a coil mounted on the movable portion.

7. The lens driving device according to claim 5 wherein, if an amount of movement ΔZ of the focal point position of the light collected by the first lens and the second lens when the first lens is moved along the optical axis by ΔZ1 and the second lens is moved along the optical axis by ΔZ2 is expressed with a coefficient a by the following equation:

$$\Delta Z = (\Delta Z1 + \alpha \cdot \Delta Z2)(1+\alpha),$$

the ratio of a weight m2 of the movable portion of the first driving means and the member mounted on the movable portion to a weight m1 of the movable portion of the second driving means and the member mounted on the movable portion, or m2/m1, is not larger than said coefficient α.

8. The lens driving device according to claim 5 wherein said second driving means is a voice coil motor having its upper and lower ends along the optical axis supported by elastic supporting members, and which is adapted for driving the movable portion in a direction along the optical axis; and wherein the center of gravity of the movable portion and the member mounted on said movable portion in the direction along the optical axis is in the vicinity of a mid point along the optical axis of an elastic supporting member supporting the upper end of the movable portion and an elastic supporting member supporting the lower end of the movable portion.

9. An optical disc system comprising:

a light source;

a first lens on which is incident the light radiated from the light source and a second lens on which is incident the light collected by said first lens; and lens driving means for driving said first and second lenses collecting the light from said light source on a signal recording surface of said optical disc;

light receiving means for receiving the return light which is collected on the signal recording surface of the optical recording medium by the lens driven by said lens driving means and which is reflected back by said optical recording medium;

said lens driving means including;

first driving means having a movable portion which is adapted for being moved in a direction along the optical axis of the light source and in a direction perpendicular to the optical axis;

second driving means mounted on a movable portion of said first driving means and having a movable portion movable in the direction along the optical axis of the light from the light source;

said first lens being mounted on a movable portion of said second driving means, said second lens being mounted on the movable portion of said first driving means, said first driving means adjusting the distances between said second lends and the optical disc and said second means adjusting the distance between said first and second lenses.

10. The optical disc system according to claim 9 further comprising:

a magnet mounted on a base portion and a coil mounted on the movable portion.

11. The optical disc system according to claim 9 wherein, if an amount of movement ΔZ of the focal point position of the light collected by the first lens and the second lens when the first lens is moved along the optical axis by ΔZ1 and the second lens is moved along the optical axis by ΔZ2 is expressed with a coefficient a by the following equation:

$$\Delta Z = (\Delta Z1 + \alpha \cdot \Delta Z2)(1+\alpha),$$

the ratio of a weight m2 of the movable portion of the first driving means and the member mounted on the movable portion to a weight m1 of the movable portion of the second driving means and the member mounted on the movable portion, or m2/m1, is not larger than said coefficient α.

12. The optical disc system according to claim 9 wherein said second driving means is a voice coil motor having its upper and lower ends along the optical axis supported by elastic supporting members, and which is adapted for driving the movable portion in a direction along the optical axis; and wherein the center of gravity of the movable portion and the member mounted on said movable portion in the direction along the optical axis is in the vicinity of a mid point along the optical axis of an elastic supporting member supporting the upper end of the movable portion and an elastic supporting member supporting the lower end of the movable portion.

* * * * *

UNITED STATES PATENT AND TRADEMARK OFFICE
CERTIFICATE OF CORRECTION

PATENT NO. : 6,414,931 B1
DATED : July 2, 2002
INVENTOR(S) : Fumisada Maeda et al.

It is certified that error appears in the above-identified patent and that said Letters Patent is hereby corrected as shown below:

Column 14,
Line 21, change "a by" to -- α by --.

Column 15,
Line 13, change "a by" to -- α by --.

Column 16,
Line 13, change "lends" to -- lens --
Line 25, change "a by" to -- α by --.

Signed and Sealed this

Twenty-seventh Day of May, 2003

JAMES E. ROGAN
*Director of the United States Patent and Trademark Office*